United States Patent
Manian et al.

(10) Patent No.: US 7,723,419 B1
(45) Date of Patent: May 25, 2010

(54) COMPOSITION PROVIDING THROUGH PLANE THERMAL CONDUCTIVITY

(75) Inventors: Hirishikesh Manian, Medina, OH (US); Asis Banerjie, Medina, OH (US); Nishant Negandhi, Medina, OH (US)

(73) Assignee: Ovation Polymer Technology & Engineered Materials, Inc., Medina, OH (US)

(*) Notice: Subject to any disclaimer, the term of this patent is extended or adjusted under 35 U.S.C. 154(b) by 0 days.

(21) Appl. No.: 12/211,805

(22) Filed: Sep. 16, 2008

Related U.S. Application Data

(60) Provisional application No. 60/973,158, filed on Sep. 17, 2007.

(51) Int. Cl.
- C08K 3/00 (2006.01)
- C08K 3/28 (2006.01)
- A01H 5/00 (2006.01)
- B60C 1/00 (2006.01)
- C08K 3/04 (2006.01)
- C04B 26/06 (2006.01)
- C08K 3/10 (2006.01)

(52) U.S. Cl. .............. 524/404; 524/428; 524/437; 524/495

(58) Field of Classification Search .............. 524/404, 524/428, 437, 495
See application file for complete search history.

(56) References Cited

U.S. PATENT DOCUMENTS

| | | | |
|---|---|---|---|
| 2001/0048172 | A1 | 12/2001 | Smith et al. |
| 2002/0058743 | A1* | 5/2002 | Tobita et al. ............... 524/495 |
| 2003/0040563 | A1 | 2/2003 | Sagal et al. |
| 2003/0139510 | A1 | 7/2003 | Sagal et al. |
| 2003/0236335 | A1 | 12/2003 | Miller et al. |
| 2004/0152829 | A1* | 8/2004 | Tobita et al. ............... 524/595 |
| 2005/0045855 | A1 | 3/2005 | Tonapi et al. |
| 2005/0161210 | A1 | 7/2005 | Zhong et al. |
| 2005/0189523 | A1 | 9/2005 | Sagal et al. |
| 2005/0209383 | A1 | 9/2005 | Miller et al. |
| 2006/0121068 | A1* | 6/2006 | Sane et al. ................ 424/400 |
| 2008/0153959 | A1* | 6/2008 | Charati et al. .............. 524/404 |

OTHER PUBLICATIONS

Hatsuo Ishida, Sarawut Rimdusit, "Very High Thermal Conductivity obtained by boron nitride-filled polybenzoxzine", "Thermochimica Acta", 1998, pp. 177-186, No. 320, Publisher: Elsevier Science B.V.

* cited by examiner

Primary Examiner—Vasu Jagannathan
Assistant Examiner—Anthony H Sheh
(74) Attorney, Agent, or Firm—Edwin A. Sisson, Attorney at Law, LLC

(57) ABSTRACT

This specification discloses a conductive composition relying upon spherical boron nitride particles and thermally expanded graphite to impart high through-plane thermal conductivity in thermoplastics for use in hot environments, including the electronics industry.

20 Claims, 2 Drawing Sheets

COMPOSITION PROVIDING THROUGH PLANE THERMAL CONDUCTIVITY

PRIORITY AND CROSS REFERENCE

This application claims priority from U.S. Provisional Patent Application 60/973,158, filed on 17 Sep. 2007 bearing the same title.

BACKGROUND

The prior art teaches boron nitride as a conductive filler, which when added to thermoplastics will make the thermoplastic composition thermally conductive. However, a limitation of boron nitride is that the through-plane thermal conductivity is not increased. Therefore the thermal conductivity is generally uni-directional, in the planar or in-plane direction.

The prior art teaches that the thermal conductivity of the thermoplastic composition can be increased with the addition of another filler, provided the filler has low aspect ratio. However, filler selection is very difficult and arduous. US Application 20030236335 teaches to not use carbon materials, such as carbon fibers and flakes since such materials tend to detrimentally affect the composition's electrically-insulating properties.

There exists therefore a composition which can increase the through-plane thermal conductivity over traditional boron nitride formulations.

SUMMARY

The specification discloses a composition comprising a Nitride component selected from the group consisting of boron nitrides, aluminum nitrides and mixtures thereof and a carbon containing filler selected from the group consisting of unexpanded graphite fibers, carbon fibers, and expanded graphite and the weight ratio of the Nitride component to the carbon containing filler is in the range of 0.5 to 3.0.

It is further disclosed that the carbon containing filler can have an aspect ratio greater than 1.0 and/or be a carbon fiber with an average length greater than 100 microns.

It is further disclosed that the Nitride component could be boron nitride present in the form of substantially spherical agglomerates and that the boron nitride could be present as particles and the particles are agglomerates having a surface area of greater than 1.5 square meters per gram.

It is further disclosed that the ratio of the weight of the Nitride component to the weight of the carbon containing filler is in the range of 1.5 to 2.0.

The composition may further comprise a thermoplastic component present in the range of 10 to 60 weight percent of the total composition. The thermoplastic component may be selected from the group consisting of acrylonitrile butadiene styrenes, (ABS), polyamides (nylon), polyesters, polycarbonates, polyethersulfones (PES), polyetheretherketones (PEEK), polyurethanes, polyphenylenesulfides (PPS), polyphenlyenesulfones (PPSU), liquid crystal polymers, polyolefins and polyimide and mixtures thereof.

DESCRIPTION

Figure 1:
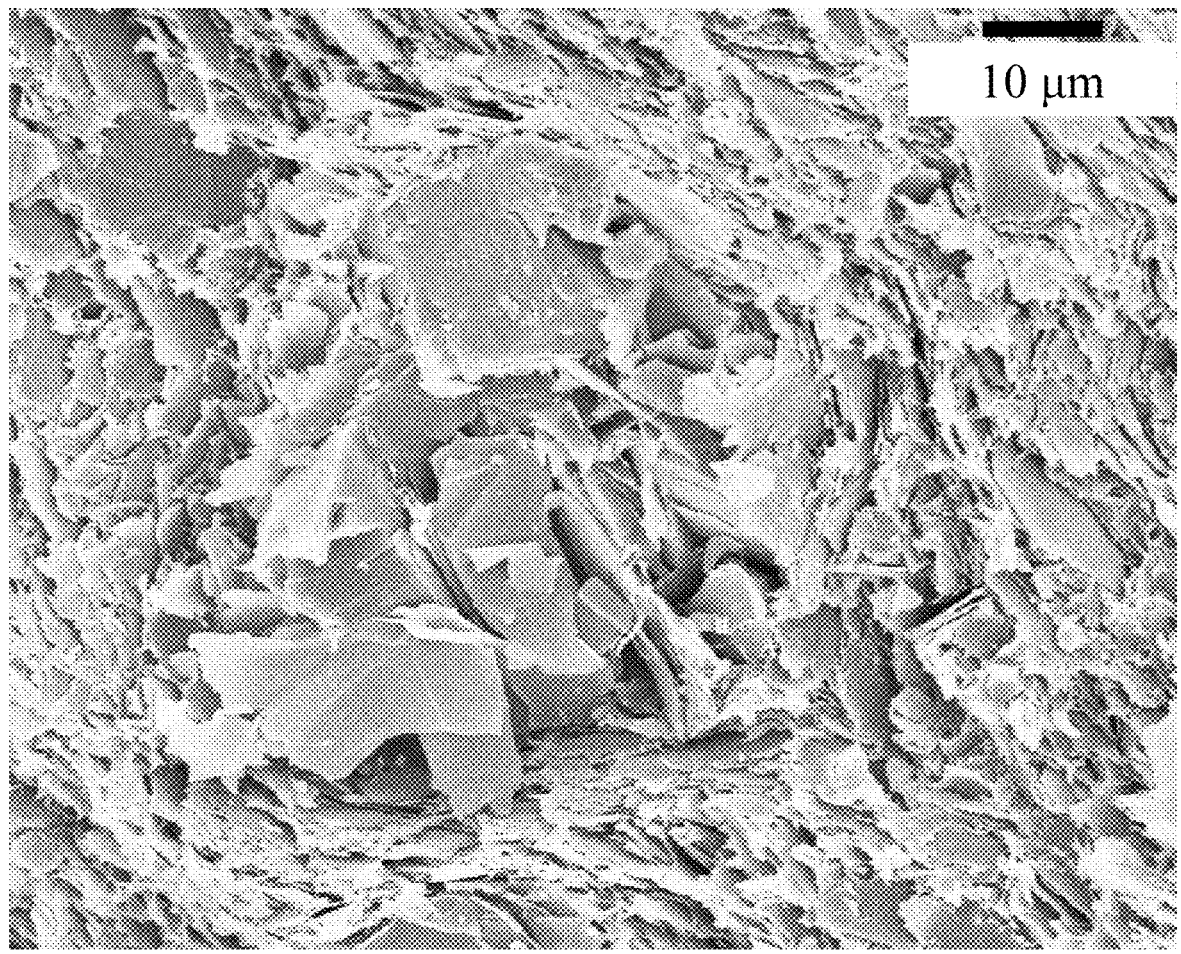
FIG. 1 is an SEM micrograph of the graphite in the composition after too much shear.

The compositions claimed in this specification comprise, can consist of, or consist essentially of a Nitride component, which could the boron nitrides, aluminum nitrides or mixtures thereof and a carbon containing filler, such as graphite fibers, carbon fibers, and expanded graphite or mixtures thereof. This composition when added to a thermoplastic component or mixture thereof, as shown in the examples, imparts thermal conductive properties to the thermoplastic, in particular increases in the through-plane thermal conductivity. The compositions can therefore comprise, consist of, or consist essentially of the Nitride component or mixture, the carbon containing filler or mixture, and the thermoplastic component or mixture.

The composition will preferably have a through-plane thermal conductivity greater than 1.0 W/m° K., with a through-plane thermal conductivity of greater than 2.0 W/m° K. even more preferred, and a through-plane thermal conductivity of greater than 3.0 W/m° K. most preferred. The through-plane thermal conductivity means that the composition or article comprising, consisting of, or consisting essentially of the composition will exhibit thermal conductivity is in two directions, each generally perpendicular to each other. One will be the in-plane conductivity and the other the through plane conductivity. Therefore, the thermal conductivities in the through-plane and the in-plane directions will each preferably be greater than 1.0 W/m° K., with the thermal conductivities of each being greater than 2.0 W/m° K. even more preferred, and thermal conductivities of each being greater than 3.0 W/m° K. most preferred.

The composition can also be void of alumina or essentially free of alumina. It is also known that the carbon filler may not have a layer of thermally conductive and electrical insulative material coated on it. In other words, the carbon filler is not coated with the nitride.

Boron nitrides useful in this composition are generally found in particle form or agglomerate form. When in particle form, the boron nitride appears as platelets having a mean particle size of 35 microns, 12-13 microns and a surface area of 0.1 to 1.0 square meters/gram. These boron nitrides are available from Momentive Performance Materials, Strongsville, Ohio USA, previously known as Advanced Ceramics, Cleveland, Oh, USA as POLARTHERM® 110 and 220 respectively.

Boron nitride is also available in agglomerates approximating a sphere, or spherical. These agglomerates have a mean particle size of 55-65 microns and a nominal surface area of 5.5 square meters/gm. These boron nitride agglomerates are available from Momentive Performance Materials, previously known as Advanced Ceramics, Cleveland Oh, USA under the tradename POLARTHERM® XLR 60.

Aluminum nitride is believed to be a good substitute for boron nitride with mixtures of the boron and aluminum nitride contemplated as well. Effective amounts of boron nitride, aluminum nitride or mixture of boron nitride and aluminum nitride when used in combination with a thermoplastic are in the range of 25 to 55 percent by weight of the total composition, with 30 to 50 percent being more effective and 30 to 45 percent being even more effective and 33 to 38 percent being the most effective.

It has been found that the nitrides can be non-functionalized, that is they do not contain functionality that would react with the thermoplastic polymer matrix.

The carbon containing filler can be graphite fibers and carbon fibers. The graphite and carbon fibers have a preferable average length of 100 microns, with 150 micron being preferred. Alternative fibers could also be potassium and ceramic whiskers. Carbon fibers are derived from primarily 2 (two) sources: polyacrylonitrile (PAN) and pitch (petroleum based). The PAN based fiber has approximately 55% carbon content and is available from a multitude of sources. The thermal conductivity of PAN based fibers is approximately 200 to 350 W/m° K. (Watt/meter-Kelvin). Pitch based fibers have approximately 85% carbon content and approach the properties of graphite and are therefore called graphite fibers due to their high carbon content. To be a graphite fiber, the fiber should have more than 80% carbon content. The thermal conductivity of graphite fibers (pitch based fibers) is approximately 900 W/m° K.

The carbon filler can also be expanded graphite which can be manufactured by a thermal expansion process. In this process, certain compounds are chemically inserted between the graphite plane and exposed to heat. The chemicals inside the graphite decompose, forcing the graphite layers apart. The expanded graphite has a worm like appearance with an apparent density of about 0.003 g/cc as compared to the theoretical density of 2.6 g/cc for unexpanded graphite. Additionally, expanded graphite can be compressed from 0.003 g/cc to densities up to 1.75 g/cc and greater. U.S. Pat. No. 3,404,061 describes how to make expanded graphite in a continuous process.

The aspect ratio of the expanded graphite is believed to lie in the range of 200-300. This is in contrast to the carbon fibers, which have a much smaller aspect ratio, between 5 and 50, approximately 10.

The expanded graphite is also known as thermally expanded graphite or graphite flake and is available from SGL Group, Germany and Graftech International, Ltd., Cleveland Ohio, USA. Grades found suitable are SGL's Conductograph GFG 200, Graftech's—Grafoil TG679 PWD, and Graftech's—Grafguard Expandable Flake 160-80N.

The carbon containing filler is effective when present at a level of 5 to 35 percent by weight of the total composition, more effective at 10 to 30 weight percent of the total composition, with even better results believed obtained at 14 to 26 weight percent and 16 to 24 weight percent of the total composition.

The thermal conductive aspect is attained by keeping the ratio of the weight of boron nitride or aluminum nitride to the weight of the carbon containing filler within the range of 0.5 to 3.0, more preferably 0.8 to 2.5, even more preferably 1.0 to 2.2, with 1.0 to 1.5 the most preferred ratio. This can also be termed as the weight ratio.

The thermally conductive composition can be mixed with virtually any thermoplastic or composite to make the resultant composition thermally conductive. While the primary experiments noted below used polycarbonate, the same thermal conductive effect is expected in ABS (acrylonitrile-butadiene-styrenes), polyesters, nylons (polyamides), polythalamides (PPA), thermoplastic elastomers, polyacetals, polyimides, PEEKs (polyetheretherketones), PES (polyethersulfones), PVC (polyvinyl chlorides), polyphenylenesulfide (PPS), polyphenylenesulfone (PPSU), liquid crystal polymer and polyolefins such as polyethylene and polypropylene. Of the polyethylenes, high density polyethylene and copolymers of high density polyethylene having a fractional melt flow index are preferred. The ingredients are then dry blended and introduced into the extruder. No special mixing or order of addition is believed to be required. The ingredients can also be added together at the throat or in different feed zones. The ingredients could also be added in a series of feeders as well or co-mingled at the throat of the extruder.

The amount of shear applied during melt mixing should be the amount required for dispersion while still maintaining the spherical structure of the nitride. The amount of shear and how to increase or decrease the shear is dependent upon the attributes of a given composition and the mixing device and the mixing parameters such as screw design, back pressure, horsepower, and speed (r.p.m.) of the screw relative to the output. These are all well-established independent variables commonly used to introduce shear into a mixing device such as an extruder.

For the examples below, it was determined that 450 rpm with kneading of 3 kneading blocks after the side feeder provided too much shear. A proper shear was reached using 250 rpm with just one kneading block.

Figure 2:
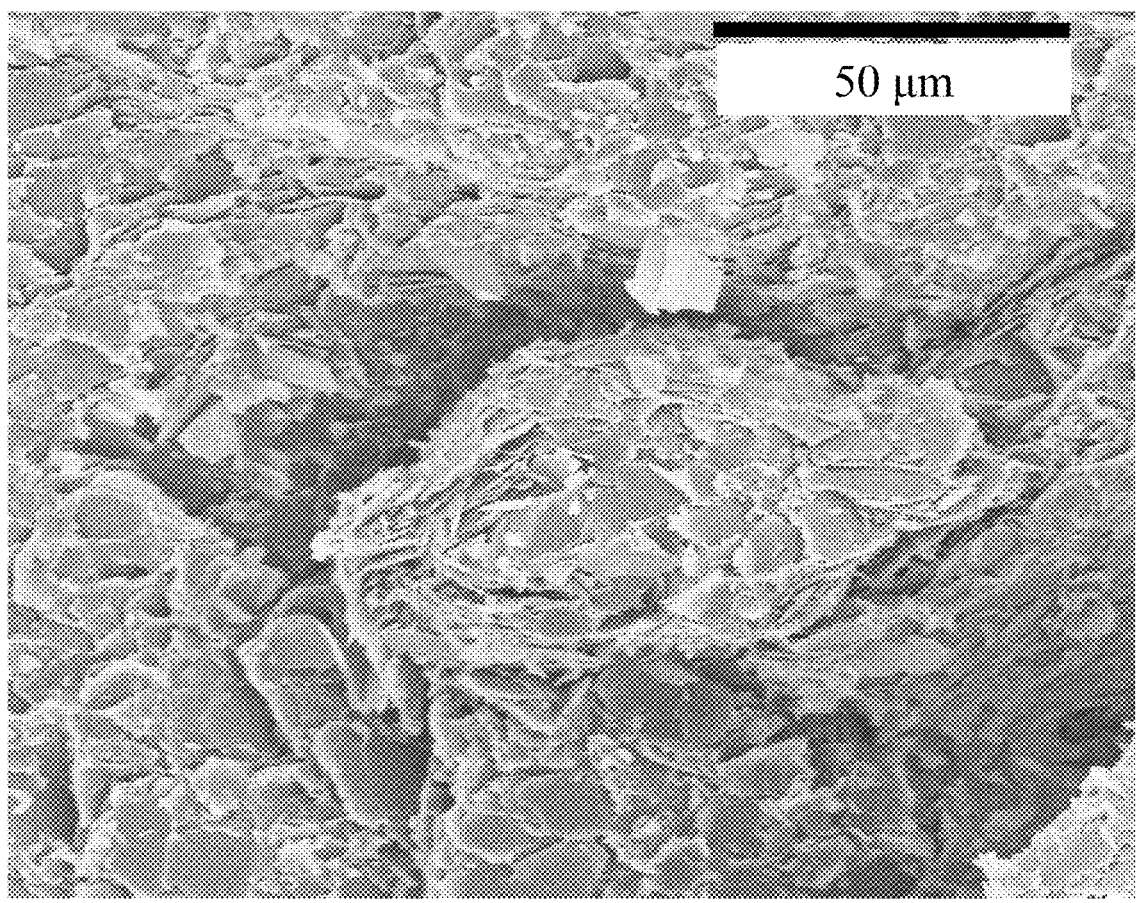
FIG. 2 is an SEM micrograph of the composition without too much shear with the structural integrity of the graphite intact.

FIG. 1 depicts a poor dispersion. The dispersion is considered poor because the amount of shear was too high and the spherical structure of boron nitride has been destroyed. In contrast, FIG. 2 shows a good dispersion. The dispersion is considered good because the shear has not been so high as to destroy the spherical structure of the boron nitride. In the successful formulation, the spherical structure of the boron nitride is maintained, or alternatively, the spherical structure of the boron nitride has not been destroyed.

The amount of thermoplastics in the composition can make up the remaining amount of the composition, or additional compounds can also be added. However, since other fillers and additives that are not essential to thermal conductivity such as compatibilizers, impact modifiers, colorants and other additives known in the art or may be discovered later are contemplated, the thermoplastic composition, which may be one thermoplastic or a mixture of several thermoplastics, may be present at 10 to 60 percent by weight of the total composition, with 15 to 55 weight percent being more preferred, and 20 to 45 weight percent being even more preferred.

An optional rubbery impact modifier such as Lotader® 8900 can be present in the range of 1 to 9 weight percent of the total composition. Lotader® resins are available from Arkema, Corporation (France) are examples of rubbery impact modifiers. The modifiers are functionalized polyolefin Ethylene-Acrylate terpolymers. These terpolymers are Ethylene-Acrylic esters-Maleic Anyhride (MAH) or Glycidyl Methacrylate (GMA). Lotader® 8900 is specifically a terpolymer of ethylene, methyl methacrylate and glycidyl methacrylate.

Another optional agreement is CBT®100, a low molecular weight thermoplastic resin of Cyclics Corporation, Schenectady N.Y. It is a blend of polybutylene terephthalate oligomers without a polymerization catalyst. It melts into a low viscosity liquid and is believed to not polymerize further into PBT. The principle of operation is described in U.S. Pat. No. 6,369,157. Ideal ranges for this compound are 2 to 8 weight percent of the total composition, with the preferred range being 3 to 5 weight percent of the total composition.

In the experiments, two high density polyethylenes are noted. HDPE-1 is a lubricant grade high density polyethylene having a high melt flow index. HDPE-2 is an extrusion grade fractional melt flow index high density polyethylene supplied by DOW Chemical, Midland, Mich. The grade is HDPE-2480 NT. The lubricant grade high density polyethylene can be present in the range of 0.5 to 7 weight percent of the total composition, with 1 to 6 weight percent being more preferred with 2 to 4.9 weight percent being the most preferred.

EXPERIMENTAL

In the experiments for Table I, the ingredients were mixed into polycarbonate resin using a twin screw extruder. Other than the desire for low shear, no special properties based upon screw design, screw profiles or addition order were observed. The other ingredients not itemized in the table are not believed to be essential to the measured properties and include such things as lubricants, antioxidants, stabilizers, elastomers, and the like. The ingredients listed as "Other" are considered non-essential to the through-plane conductivity and consist of impact modifiers, cyclic polybutylene oligomers, and polyolefins.

The typical weight percent and composition of the "Other" ingredients as in Example 2 and 3 was:

| | |
|---|---|
| Lubricant Grade HDPE (Grade 500200) supplied by Equistar Chemicals, Houston TX | (3.00 wt %) |
| Kenrich ® Capow L38/H - a titanate from Kenrich Petrochemicals, Inc. NJ | (0.50 wt %) |
| CBT ® 100 - cyclic polybutylene oligomers | (5.00 wt %) |
| Lotader ® 8900 - elastomer | (2.00 wt %) |
| | (10.5 wt %) |

The Boron Nitride Types, available from Advanced Ceramics, now Momentive Performance Materials, Albany, N.Y., are BN-1, POLARTHERM® 110, 35 micron, BN-2, POLARTHERM® 120, 12-13 micron BN-3, POLARTHERM® XLR 60, spherical agglomerates, 55-65 micron Tables II and III show alternate embodiments possessing through-plane conductivity in the range of 2.75 to 3.5 W/m° K.

Samples were made by combining the materials indicated in an extruder and analyzed using ASTM 1461.

TABLE I

EXPERIMENTAL RESULTS WITH POLYCARBONATE

| Exp ID | Boron Nitride Type/ (wt. %) | Filler (wt. %) | Thermoplastic/ (wt. %) | Other (wt. %) | Through-Plane Thermal Conductivity (W/m ° K) |
|---|---|---|---|---|---|
| Comp. 1 | BN-1/40 | 0 | Polycarbonate/58 | 2 | 0.78 |
| Comp. 2 | BN-2/40 | 0 | Polycarbonate/58 | 2 | 0.64 |
| Comp. 3 | BN-3/40 | 0 | Polycarbonate/58 | 2 | 0.82 |
| Comp. 4 | BN-1/20 | ZnO/20 | Polycarbonate/55.7 | 4.3 | 0.53 |
| Work Ex. 1 | BN-1/20 | Graphite Fiber/20 | Polycarbonate/56.25 | 3.75 | 0.9 |
| Work Ex. 1 | BN-1/20 | Graphite Fiber/20 | Polycarbonate/56.25 | 3.75 | 0.9 |
| Work Ex. 2 | BN-3/35 | Carbon Fiber/20 | Polycarbonate/34.5 | 10.5 | 1.1 |
| Work Ex. 3 | BN-3/35 | Expanded Graphite/20 | Polycarbonate/34.5 | 10.5 | 3.75 |

TABLE II

ALTERNATE EMBODIMENTS

| | Alt Ex. 1 | Alt Ex. 2 | Alt Ex. 3 | Alt Ex. 4 | Alt Ex. 5 | Alt Ex. 6 |
|---|---|---|---|---|---|---|
| Thermoplastic Type/Amount (wt %) | PEEK/35.00 | PPS/35.00 | PPA/35.00 | PES/35.00 | PPSU/35.00 | Nylon 12/35.00 |
| Boron Nitride - 3 | 35.00 | 35.00 | 35.00 | 35.00 | 35.00 | 35.00 |
| High Density Polyethylene (HDPE - 1) | 3.00 | 3.00 | 3.00 | 3.00 | 3.00 | 3.00 |
| CBT ® 100 | 5.00 | 5.00 | 5.00 | 5.00 | 5.00 | 5.00 |
| Lotader ® 8900 | 2.00 | 2.00 | 2.00 | 2.00 | 2.00 | 2.00 |
| graphite flake GFG 200 | 20.00 | 20.00 | 20.00 | 20.00 | 20.00 | 20.00 |
| Total | 100.00 | 100.00 | 100.00 | 100.00 | 100.00 | 100.00 |

TABLE III

HIGH DENSITY POLYETHYLENE BASED EMBODIMENTS

| | HDPE Ex. 1 | HDPE Ex. 2 | HDPE Ex. 3 |
|---|---|---|---|
| HDPE-2/Amount (wt %) | 41.00 | 41.00 | 42.00 |
| HDPE-1 | 2.00 | 2.00 | 2.00 |
| Boron Nitride-3 | 10.00 | 20.00 | 0.00 |
| Boron Nitride-1 | 20.00 | 10.00 | 25.00 |
| CBT ® 100 | 5.00 | 5.00 | 8.00 |
| Lotader ® 8900 | 2.00 | 2.00 | 3.00 |
| graphite flake GFG 200 | 20.00 | 20.00 | 20.00 |
| Total | 100.00 | 100.00 | 100.00 |

We claim:

1. A composition comprising boron nitride and expanded graphite wherein the boron nitride in the form of substantially spherical agglomerates having a mean particle size of about 55-65 microns and the weight ratio of the boron nitride to the expanded graphite is in the range of 0.5 to 3.0.

2. The composition of claim 1, wherein the expanded graphite has an aspect ratio greater than 1.0.

3. The composition of claim 1, wherein the boron nitride particles have a surface area of greater than 1.5 square meters per gram.

4. The composition of claim 3, wherein the expanded graphite has an aspect ratio greater than 1.0.

5. The composition of claim 3, where the ratio of the weight of the boron nitride to the weight of the expanded graphite is in the range of 1.5 to 2.0.

6. The composition of claim 1, wherein the composition further comprises a thermoplastic component present in the range of 10 to 60 weight percent of the total composition and the boron nitride is maintained as substantially spherical particles in the thermoplastic component.

7. The composition of claim 2, wherein the composition further comprises a thermoplastic component present in the range of 10 to 60 weight percent of the total composition and the boron nitride is maintained as substantially spherical particles in the thermoplastic component.

8. The composition of claim 6, wherein the thermoplastic component is selected from the group consisting of acrylonitrile butadiene styrenes, (ABS), polyamides (nylon), polyesters, polycarbonates, polyethersulfones (PES), polyetheretherketones (PEEK), polyurethanes, polyphenylenesulfides (PPS), polyphenlyenesulfones (PPSU), liquid crystal polymers, polyolefins and polyimide and mixtures thereof.

9. The composition of claim 8, wherein the thermoplastic component is polycarbonate.

10. The composition of claim 8, wherein the thermoplastic component is polyamide (nylon).

11. The composition of claim 6, wherein the thermoplastic component is a polyphenylenesulfide (PPS).

12. The composition of claim 6, wherein the thermoplastic component is a polycarbonate.

13. The composition of claim 6, wherein the thermoplastic component is an acrylonitrile butadiene styrene.

14. The composition of claim 6, wherein the thermoplastic component is a polyamide.

15. The composition of claim 6, wherein the thermoplastic component is a polyester.

16. The composition of claim 6, wherein the thermoplastic component is a polyethersulfone.

17. The composition of claim 6, wherein the thermoplastic component is a polyetheretherketone.

18. The composition of claim 6, wherein the thermoplastic component is a polyurethane.

19. The composition of claim 6, wherein the thermoplastic component is a polyolefin.

20. The composition of claim 6, wherein the thermoplastic component is a polyimide.

* * * * *